Patented June 20, 1944

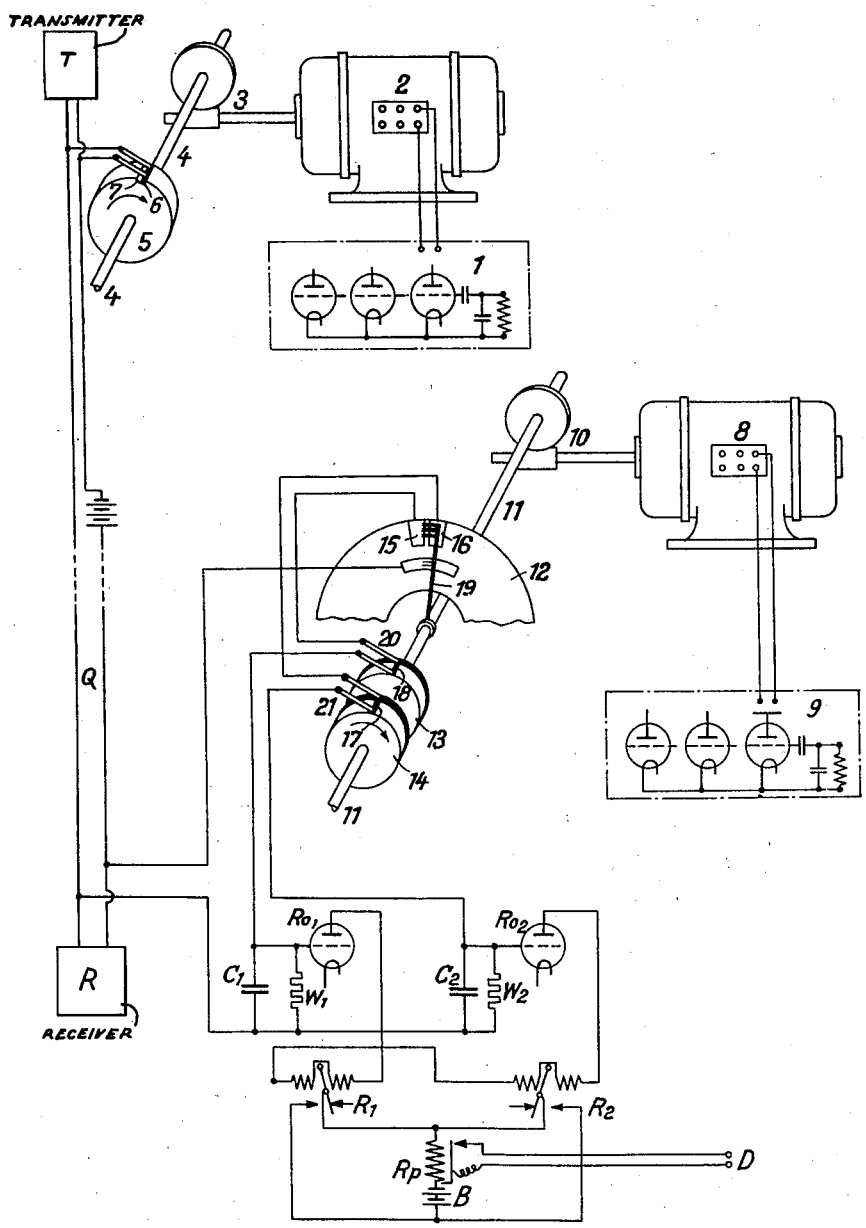

2,352,050

UNITED STATES PATENT OFFICE 2,352,050

SYNCHRONIZING ARRANGEMENT

Gustav Wegener, Berlin, Germany; vested in the Alien Property Custodian

Application October 10, 1941, Serial No. 414,481
In Germany June 24, 1940

2 Claims. (Cl. 178—69.5)

In telegraph systems or the like, arrangements are known in which a control shaft of the sender causes an impulse to be emitted every time this shaft has made a revolution. This impulse, the so-called phase impulse, acts to insure the correct phase position of a shaft of the receiver, provided that sender and receiver operate synchronously.

There are arrangements of this kind in which the phase impulse is transmitted only during the phase adjustment of the controlled shaft of the receiver, the impulse ceasing as soon as the phase position at the receiver is correct. The sender then emits telegraph signals, for instance, to the exclusion of phase impulses. In other arrangements, the sender produces the phase impulse continually, that is, produces it even during the emission of other signals, such as telegraph signals, for example.

In the case of these arrangements it is difficult or impossible to correct the phase position of a receiver shaft during the transmission of other signals, especially if these are similar to the phase impulse.

According to the present invention the correct phase relation between two synchronously running shafts is obtained by means of a multi-step phase signal selected from an irregular series of signals of the same kind.

In the arrangement here described by way of example a phase signal is emitted after each rotation of the control shaft. This signal is composed of two or several steps, namely, current steps or so-called marking impulses and no-current steps, also designated as spacing steps. These steps are made to follow upon one another alternately. It is immaterial whether the phase signal begins with a no-current step succeeded by a current step or whether the reverse order is adopted.

In arrangements according to the present invention, provided that the sender and receiver shafts run synchronously with each other, the multi-step phase signal, produced by the sender after each revolution of its control shaft, causes the receiver shaft automatically to assume the correct phase position even if the shaft of the sender emits, in addition to the phase signal, signals which are similar to the phase impulse.

The invention will be understood from the following description in which a two-step phase signal is referred to by way of example.

The accompanying drawing shows a circuit diagram of one embodiment of the invention.

The sender has a motor 2 which is synchronised by a synchronizing device 1 and drives a shaft 4 through a gearing 3. Shaft 4 is the control shaft of the sender and carries an impulsing device 5 that serves to produce the phase impulse. Each such impulse is composed of a current step and a no-current step. The current step is produced by a segment 6, while the no-current step is due to the provision of a segment 7. The phase impulse is transmitted over a line Q or by wireless to the receiver, that is, the arrangement to be controlled by this impulse as regards the phase position of a shaft 11 thereof. The receiver has a motor 8 synchronized by a synchronizing device 9. Shaft 11 is arranged to be driven through a gearing 10 and carries a distributor 12 and two contact discs 13, 14. The distributor 12 has two segments 15, 16. Whenever the shafts 4, 11 are cophasal in position the segment 15 serves to receive the current step of the phase signal, while segment 16 is to receive the no-current step. The discs 13, 14 have contact segments 17, 18, respectively, which serve to connect them to storing devices $C_1$, $C_2$, here shown to be condensers. The storing devices are arranged to discharge across resistances $W_1$, $W_2$, respectively, which are included in the grid circuits of electron tubes $Ro_1$ and $Ro_2$. The assemblies $C_1$, $W_1$ and $C_2$, $W_2$ also determine the operating period of relays $R_1$, $R_2$. The arrangement is such that the tubes $Ro_1$, $Ro_2$ are under the control of the circuits $C_1$, $W_1$ and $C_2$, $W_2$, respectively, and thereby are able to actuate the relays $R_1$, $R_2$. The relays $R_1$, $R_2$ in their turn control a relay $Rp$ with the aid of a battery B. Relay $Rp$ is to effect the phase correction of shaft 11 by turning it in the respective direction until the correct phase position thereof has been established. Such variation of the phase position of shaft 11 may be effected in electric or mechanical fashion by a suitable device at D. For instance, the electric operation may consist in displacing the stator field of the motor 8. The mechanical operation may be effected by a member arranged to accelerate or retard the rotation of shaft 11 by means of a gearing that can be thrown out of service. The synchronism of the shafts 4, 11 may be established by local time or cadence tappers, such as the synchronizing devices 1, 9, or by connecting the motors 2, 8 to an existing synchronizing network.

On each revolution of the shaft 4 the impulsing device 5, 6, 7 produces the aforesaid phase impulse or phase signal which, as stated, is composed of a current step and a subsequent no-current step. The phase signal is transmitted to the distributor 12 of the receiver by line Q or by wireless. When the signal reaches the distributor 12, a brush 19 thereof may be in any one of the positions it assumes during one revolution. In this regard, mainly two possibilities require consideration. If the shafts 4, 11 are cophasal in position the current step of the phase signal will reach the distributor the instant at which the brush 19 begins to sweep the segment 15. When brush 19 is about to leave segment 15, the segment 18 of contact disc 13 reaches the brushes 20. As a result, a small amount of the current step flows over the brushes 20 and segment 18 to storing device $C_1$ by which this short impulse is stored. The ensuing discharge of $C_1$ across the resistance $W_1$ acts to vary the anode current of tube $Ro_1$ and thereby causes relay $R_1$ to assume the condition shown in the drawing. Relay $R_1$ thus does not energize the relay $Rp$. Consequently, the control device at D, arranged to adjust the phase position of shaft 11, is not actuated. On leaving the segment 15 brush 19 begins to sweep the segment 16. At the same time the no-current segment 7 of the sender becomes effective so that the brush 19 when sweeping over segment 16 does not meet an impulse. While the brush is moving over segment 16 the brushes 21 become interconnected by the segment 17 of the rotating disc 14. Storing device $C_2$ thus becomes joined to segment 16 but is not charged since there is no potential on the segment. The current in the tube $Ro_2$ hence is not varied. Relay $R_2$ therefore remains in the state represented in the drawing. It will thus be seen that in this case the relay $Rp$ is not actuated. The control device at D hence remains inoperative, so that the phase position of shaft 11 is not altered, this position being correct.

If the phase position be not correct the brush 19 will be so positioned with respect to distributor 12 that the segments 15, 16 are not at all reached by the phase signal or are reached in part only. Accordingly, the charging of the storing devices $C_1$, $C_2$ will be other than in the former case. For instance, there may be no charging at all. Also, the current step of the phase signal may impinge upon both segments 15, 16 and thereby cause both storing devices to be charged. Furthermore, the current step may impinge upon segment 16, thus charging the storing device $C_2$ instead of $C_1$. In all these events relay $Rp$ is actuated by relay $R_1$ or relay $R_2$, as the case may be, so as to adjust the shaft 11 as to its phase position with the aid of the control device at D. This operation does not cease until the current step clearly impinges upon segment 15, while the no-current step is effective only as long as segment 16 is swept by the brush 19.

As the phase signal, periodically transmitted to the receiver, comprises current and no-current steps the novel arrangement will also be useful where other signals are emitted together with the phase signal.

What is claimed is:

1. A synchronizing arrangement for printing telegraphs and the like comprising a transmitter, receiver and an interconnecting telegraph circuit, rotary contact means for transmitting from said transmitter a synchronizing signal composed of two impulses of different characteristics, a rotary shaft at said receiver, a distributor having two segments, a brush secured to said shaft cooperating with said segments, a pair of rotary members secured to said shaft each having a single contact, a brush for each rotary member, the last mentioned brushes being each connected to one of said segments, a pair of vacuum tubes having an anode and an input circuit comprising a grid, a second brush for each of said rotary members connected to the input circuit of the respective tubes, a relay in the anode circuit of each tube, said relays having oppositely connected contacts, a circuit common to said relays including a third relay arranged when operated to cause a phase correcting device to control said shaft, the angular position of the rotary signal transmitting and receiving contacts being such that when said shaft is co-phasal with the transmitter the two synchronizing impulses are received on the respective segments, one impulse causing one tube to operate its associated relay to a position where the contacts thereof open the circuit to said third relay while the second impulse does not alter the condition of the second vacuum tube and its associated relay.

2. A synchronizing arrangement for printing telegraphs and the like comprising a transmitter, receiver and an interconnecting telegraph circuit, rotary contact means for transmitting intermittently from said transmitter a synchronizing signal composed of closely related instantaneous current and non-current signals, rotary contact means associated with the receiver and having closely related contacts in co-phasal relation to the transmitter contact means, a phase correcting device for the receiver, and a reversely acting operating relay for the correcting device, reversely acting relays connected to energize the operating relay and energizing circuits for said reversely acting relays connected to the receiver contact means to be operative in co-phasal relation to open the normally closed relay and to effect corrective operation of the operating relay upon displacement in either direction.

GUSTAV WEGENER.